T 866016

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 16, 1969

866 O.G. 701

743,678
COLLAPSIBLE STEERING COLUMN FOR A MOTOR VEHICLE

Ronald J. H. Woolgar, Danbury, England, assignor to Ford Motor Company, Dearborn, Mich., a corporation of Delaware

Filed July 10, 1968. Published Sept. 16, 1969
Int. Cl. B62d *1/18*
U.S. Cl. 74—492
1 Sheet Drawing. 6 Pages Specification

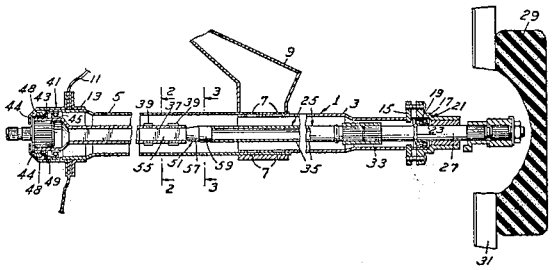

A collapsible steering column assembly includes two telescopically slidable tubes 3 and 5 joined together by readily shearable rivets 7 and connected to a support bracket 9. In a crash, the bracket 9 is designed to yield and the tubes to telescope. In tube 3, a bearing 21 supports the upper part 27 of a three-part steering shaft 25. The part 27 is connected to a steering wheel 31 at one end and to an intermediate shaft part 35. Shaft part 35 is a hollow tube with a circular cross section and extends into a hollow lower shaft part 37 having a square cross section. Shaft parts 35 and 37 are connected by readily shearable rivets 39. A solid piece 51 is welded to the lower end of shaft part 35. Piece 51 has an end portion 55 having a square cross section of the same size as that of the part 37, an intermediate tapered portion 57 and an upper end portion 59 with a circular cross section. A severe impact upon the steering wheel forces the shaft part 35 to move axially whereby rivets 39 are sheared and tapered portion 57 enters part 37. In entering part 37, portions 57 and 59 deform the part 37 since the diameter of portion 59 is greater than the width of part 37. In deforming the part 37 energy is absorbed.

T866016
743,678
DEF. PUB.
Sept. 16, 1969 R. J. H. WOOLGAR
COLLAPSIBLE STEERING COLUMN FOR A MOTOR VEHICLE
Filed July 10, 1968
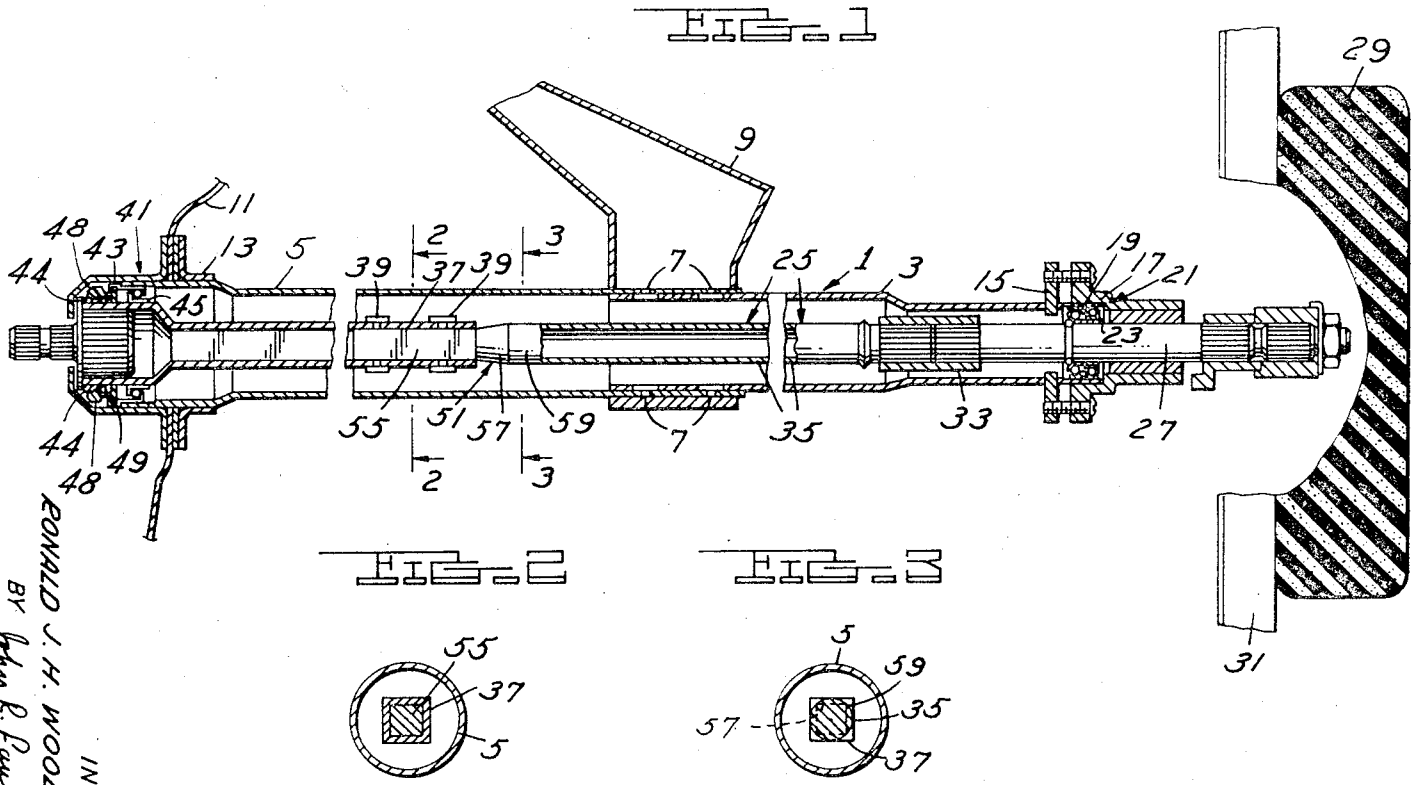
INVENTOR
RONALD J. H. WOOLGAR
BY John R. Faulkner
Clifford L. Sadler
ATTORNEYS